United States Patent
Berko et al.

(10) Patent No.: US 12,105,852 B2
(45) Date of Patent: Oct. 1, 2024

(54) AUTOMATIC IDENTIFICATION OF FILES WITH PROPRIETARY INFORMATION

(71) Applicant: Acronis International GmbH, Schaffhausen (CH)

(72) Inventors: Nickolay Berko, Schaffhausen (CH); Ivan Klimov, Schaffhausen (CH); Serg Bell, Singapore (SG); Stanislav Protasov, Singapore (SG)

(73) Assignee: Acronis International GmBH, Schaffhausen (CH)

( * ) Notice: Subject to any disclaimer, the term of this patent is extended or adjusted under 35 U.S.C. 154(b) by 227 days.

(21) Appl. No.: 17/804,833

(22) Filed: May 31, 2022

(65) Prior Publication Data
US 2023/0385455 A1 Nov. 30, 2023

(51) Int. Cl.
*G06F 21/64* (2013.01)
*G06Q 50/18* (2012.01)

(52) U.S. Cl.
CPC .......... *G06F 21/64* (2013.01); *G06Q 50/184* (2013.01)

(58) Field of Classification Search
CPC .............................. G06F 21/64; G06Q 50/184
See application file for complete search history.

(56) References Cited

U.S. PATENT DOCUMENTS

| | | | |
|---|---|---|---|
| 10,437,507 B2 | 10/2019 | Tormasov et al. | |
| 11,210,419 B2 | 12/2021 | Beloussov et al. | |
| 11,288,368 B1 * | 3/2022 | Wesson | G06F 21/64 |
| 11,636,121 B1 * | 4/2023 | Dub | G06F 16/35 |
| | | | 707/739 |
| 2015/0033120 A1 * | 1/2015 | Cooke | G06F 40/194 |
| | | | 715/256 |
| 2016/0162691 A1 * | 6/2016 | Arnold | H04L 9/3247 |
| | | | 726/26 |
| 2017/0193230 A1 * | 7/2017 | Jevnisek | G06F 21/564 |
| 2017/0277774 A1 * | 9/2017 | Eigner | G06Q 30/0204 |
| 2019/0121627 A1 * | 4/2019 | Peterson | G06F 8/751 |
| 2019/0236102 A1 * | 8/2019 | Wade | G06F 40/205 |
| 2019/0272375 A1 * | 9/2019 | Chen | G06N 5/045 |
| 2020/0004980 A1 * | 1/2020 | Blass | G06F 21/6218 |
| 2021/0397912 A1 * | 12/2021 | Ching | G06K 15/1822 |
| 2022/0092212 A1 * | 3/2022 | Shah | G06F 21/57 |
| 2022/0129417 A1 * | 4/2022 | Diaz | G06F 21/562 |
| 2022/0179948 A1 * | 6/2022 | Prudkovskiy | G06F 21/562 |
| 2022/0206759 A1 * | 6/2022 | Samuel | G06F 8/10 |
| 2022/0309077 A1 * | 9/2022 | Pomerantsev | G06F 16/285 |

(Continued)

FOREIGN PATENT DOCUMENTS

GB 2370393 A * 6/2002 ............. G06F 21/10

*Primary Examiner* — Stephen T Gundry
(74) *Attorney, Agent, or Firm* — ESPE Legal Consultancy FZ-LLC

(57) ABSTRACT

A system for identifying of presence of protected data in an unknown file includes a processor coupled to a memory storing instructions, the processor being configured to implement the instructions to apply a sliding window process to generate one or more fragments of length, for each generated fragment, check whether information about the generated fragment exists in a library of known fragments of protected data, and if the information about the generated fragment from the unknown file exists in the library of known fragments of protected data, perform steps to reflect an existence of the information about the generated fragment.

20 Claims, 3 Drawing Sheets

101. Symbol Position:    ...  i  i+1  i+2  i+3  i+4  i+5  i+6  i+7  i+8  i+9  ...
Symbol: ... a b c d e f g h i J ...

102. 7-Symbol Fragment # i: a b c d e f g 103. 7-Symbol Fragment # i+1: b c d e f g h 104. 7-Symbol Fragment # i+2: c d e f g h i 105. 7-Symbol Fragment # i+3: d e f g h i j

(56) References Cited

U.S. PATENT DOCUMENTS

| | | | |
|---|---|---|---|
| 2022/0318417 A1* | 10/2022 | Beecham | G06F 16/9024 |
| 2023/0053121 A1* | 2/2023 | Stevens | G06F 16/90335 |
| 2023/0246844 A1* | 8/2023 | Beecham | H04L 9/3242 |
| | | | 709/227 |
| 2023/0252233 A1* | 8/2023 | Gutierrez | G06F 40/20 |
| | | | 704/9 |
| 2023/0259640 A1* | 8/2023 | Metzler | G06F 21/6218 |
| | | | 713/191 |

* cited by examiner

| 101. Symbol Position: | ... | i | i+1 | i+2 | i+3 | i+4 | i+5 | i+6 | i+7 | i+8 | i+9 | ... |
|---|---|---|---|---|---|---|---|---|---|---|---|---|
| Symbol: | ... | a | b | c | d | e | f | g | h | i | J | ... |
| 102. 7-Symbol Fragment # i: | | a | b | c | d | e | f | g | | | | |
| 103. 7-Symbol Fragment # i+1: | | | b | c | d | e | f | g | h | | | |
| 104. 7-Symbol Fragment # i+2: | | | | c | d | e | f | g | h | i | | |
| 105. 7-Symbol Fragment # i+3: | | | | | d | e | f | g | h | i | j | |

Fig. 1

AUTOMATIC IDENTIFICATION OF FILES WITH PROPRIETARY INFORMATION

TECHNICAL FIELD

The present invention pertains to computer systems and methods for protection of the data at these systems by identifying fragments of known protected data within documents presented for inspection.

BACKGROUND

Companies are faced with ever increasing volumes of data. Some of the data stored within files contains protected or sensitive information, including trade secrets, personal information, and information whose disclosure is restricted by regulations or laws.

Every file within a company potentially includes protected information. This information can be copied to a different location within the corporate network or to a peripheral device. The information may also be transmitted by email, instant messaging, SMS, or even social media.

Current automated solutions stop at creating a library of known files previously identified as containing protected information, calculating hash values for every file in the library, and then later comparing the hash of files about to be copied or transmitted.

A malicious actor may copy a fragment of corporate protected information from a known document containing a protected document and add it to a new or existing document thus creating a completely new document that would not be caught by any of the current systems that perform comparison on the file level.

New solutions are needed that are capable of discovering fragments of known protected data within a wider range of documents likely to contain such data.

Further, inadvertent unauthorized release of trade secrets may lead to significant financial losses, loss of competitive edge, and may have negative consequences that could threaten the existence of a company.

A method is needed to automatically determine classification of private information based on previously classified files.

SUMMARY

The present invention is directed to a method and system to optimize a process of identification of fragments of proprietary information in a file under investigation by comparing the hashes of these fragments to hashes of fragments of known files containing proprietary information.

Exemplary aspects of the present invention concern transferring unknown files via email, instant messengers, SMS, social media, as well as other communication media. Unknown files are copied to a location on a network or to a peripheral device. Newly created files are copied for the purpose of cataloging, storing, and determining proper security controls.

Automatic data classification is provided by a process that recognizes protected data in an unknown file without having to manually review contents of each file.

A new file under investigation may be preprocessed before hashes of its fragments are calculated.

If a hash of at least one of the fragments matches the hash in the library of known files containing proprietary information, then the file under investigation is marked as proprietary.

Matching may use additional information for file classification, such as binary/textual, language of the file, and so on.

Hashes in the database may include hierarchical classification similar to the secret data classification. In that case, a score is calculated based on the number of matched hashes and their classifications. That is, one hash has different classifications based on the classifications of the files in a library that contain fragments used to generate such hash.

BRIEF DESCRIPTION OF DRAWINGS

The exemplary aspects of the invention will be better understood from the following detailed description of the exemplary embodiments of the invention with reference to the drawings:

FIG. 1 shows an exemplary aspect for a Sliding Window Algorithm of Generation of N-fragments from a File;

DETAILED DESCRIPTION

Figure 2:
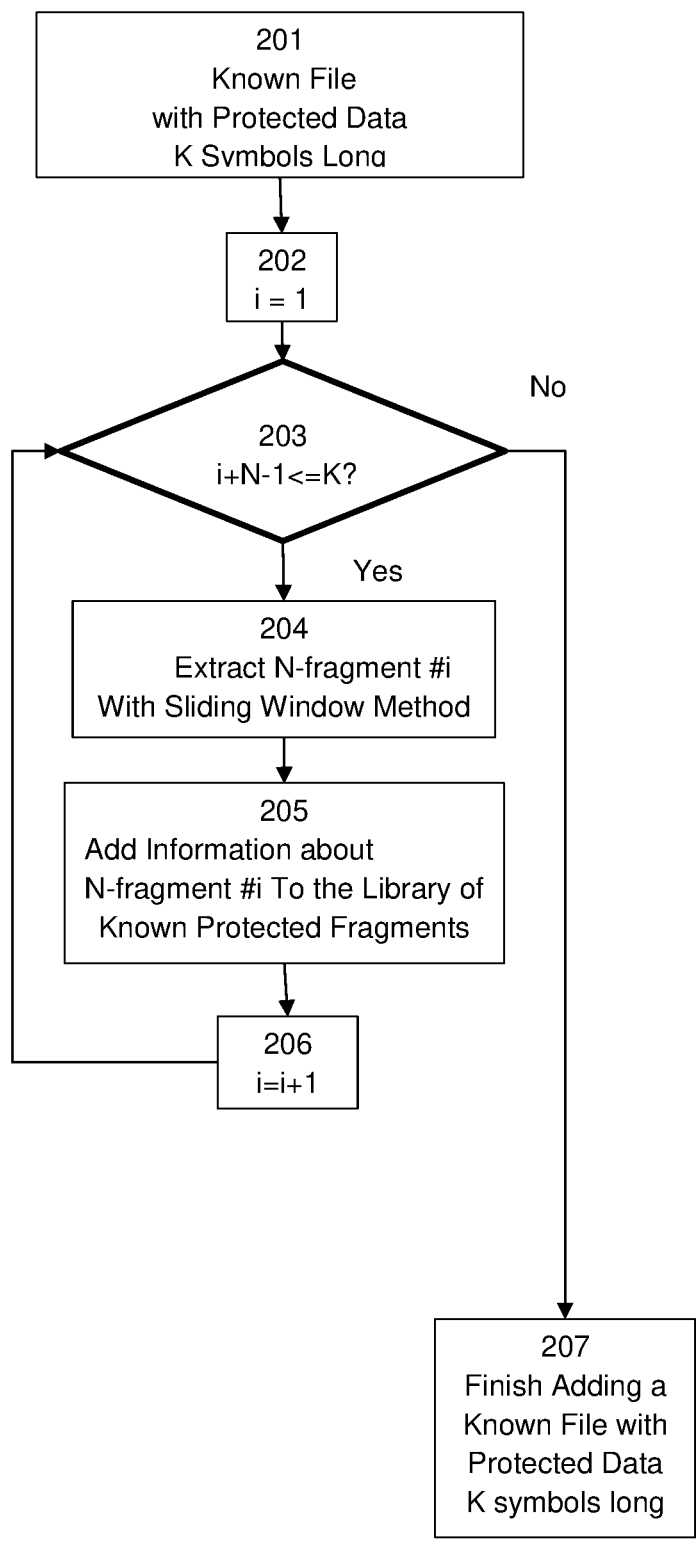
FIG. 2 shows generation of Library of Sensitive Fragments according to an exemplary embodiment.

An exemplary aspect of the present invention is directed to creation of a library of fragments of certain fixed length N of all files known to contain protected information.

The process of generation of these fragments is a sliding window with the length of N characters that starts with the first symbol in the file and moves towards the end of the document with the step of 1 symbol, thus enumerating all possible continuous fragments of length N that can be identified within the file. If the length of the file is K symbols, there are K−N+1 fragments of length N that exist within the document.

For each identified N-fragment, a hash value is calculated. This hash becomes a means for identifying the given N-fragment.

A collection of all unique hash values from each file known to contain protected information becomes the library that is used to inspect the unknown file (the "Library").

A similar process is performed for the unknown file. Using the sliding window, every possible N-fragment is identified, a hash for that fragment is calculated and compared against the library of hashes of N-fragments from the known files that contain protected information.

If none of the hashes of N-fragment of the unknown files matches any of the hashes of N-fragments from the Library, then the unknown file is considered not containing any of the known protected information.

If at least one of the hashes of N-fragments of the unknown file matches a hash of the N-fragments from the Library, then the unknown file is considered a suspect.

The number N, the length of the sliding window can be determined heuristically.

Additionally, numerous embodiments have been proposed that provide systems and methods for optimization of the process.

These systems and methods comprise performing different preprocessing depending on the nature of the unknown file, such as document, binary, and so on. Unformatted text is extracted from documents, both in the Library and from the unknown file. Text is converted to uniform formatting, for example, by removing double spaces or enforcing the single-space-after-a-comma rule. Alternatively, all punctuation marks are removed or all spaces. All non-Latin characters are replaced according to rules, either symbol-for-symbol or one-or-more-symbols-for-symbol to accommodate alphabets with the number of characters larger than the number of characters in Latin alphabet. The sliding window step is changed from one symbol to sliding from the first symbol of one word to the first symbol of the next word. For a binary file, this means first performing decompilation and later working with the decompiled version as a text file. Finally, a library is created of hash values of N-fragments of publicly available files that are related in some way, shape or form to the protected information in the Library (a "Public Library"). Such a Public Library may help to exclude false positives from the Library, if a hash of an N-fragment exists in the Public Library, then corresponding N-fragment is not a part of protected information, and its hash can be removed from the Library thus contributing to the efficiency of search.

The present invention also allows for implementation of hierarchical classification of protected data.

In an embodiment, the Library contains additional statistical information about each fragment that may include (1) hierarchical class of the file that contains the fragment and the number of different files of a given hierarchical class that contain such fragment.

Different approaches may be used to calculate the inferred hierarchical class of the information contained in the unknown file, for example, the lowest classification of any of the matching fragments may be assigned to it.

For example, if an N-fragment from an unknown file matched an N-fragment from the library, and the matching N-fragment from the Library can be found in both Secret and top-Secret documents, then the unknown file can be marked as Secret.

Alternatively, a combination of the statistics of each of the matched hashes from the Library, and the statistics of matching fragments from the unknown file are used to infer the hierarchical class of the unknown file.

The formula comprises a statistical function such as maximum, minimum, average, weighted average, or median. Alternatively, a formula of any complexity involving mathematical, logical, and other constructs.

To begin the process, one or more locations are specified where files containing the protected data are stored (the "Protected Storage").

A computer program then performs optional preprocessing of all files in that location according to their types (e.g., document, binary, etc.).

Then, the computer program, using the sliding window of length N algorithm (the sliding step may vary and depend on the particular implementation), creates a library of hashes for every N-fragment identified by the sliding window process for every file in the Protected Storage thus creating the Library.

Optionally, statistical data is added to the Library, hierarchical or other classification is added to the Library, or a Public Library is created by first identifying files in public domain that may be related to the files in the Protected Storage (e.g., by identified key words or area of research).

Later, using the same preprocessing and sliding window processes for the same types of files as have been used for the creation of the Library, create a collection of all hashes of all N-fragments of these files from public domain that have been identified by the sliding window process.

In case a Public Library is used, remove fingerprints from the Library that are found in the Public Library.

Other methods including manual review may be used to further exclude hashes of N-fragments from the Library (e.g., certain document signatures, legal disclaimers, policy statements, certain standard headers or footers).

When an unknown file is presented for inspection, use the same preprocessing that was used for the same type of files in the process of creation of the Library and Public Library, create a collection of hashes of identified N-fragments for the unknown file (the "Unknown Fingerprint List"). Further, compare fingerprints from the Library to the fingerprints from the Unknown Fingerprint List.

The comparison process may differ, for example, in some cases a single match may be sufficient to decide that the unknown file is a suspect for containing protected information.

In other cases, every fingerprint from the Library needs to be compared to each of the fingerprints from the Unknown Fingerprint List to collect statistics sufficient to infer a potential class of the unknown file.

There also may be other cases where partial matching may be done, for example, if a matching fragment with the highest classification has been identified.

A problem exists to find text fragments in documents that are the same as fragments of files that belong to a certain library (e.g., files containing information that is proprietary to the company).

If the library contains electronic copies of classified documents, then such search may help prevent leakage of secret data.

The search algorithm only considers fragments of length equal to given N fr. The search algorithm ignores all fragments of a smaller length as these may be considered random or insignificant occurrences.

A direct enumeration of all possible fragments of the unknown document that is being analyzed and their comparison to all possible fragments from the library has a computational complexity of O (N fr*N doc*N libr), where N doc is the size of the document under investigation, and N libr is the number of documents (files) in the library.

A significant disadvantage of such an approach is the necessity to keep all documents in the library in their native format or convert them to the original format in order for the described algorithm to work.

A solution that allows to optimize this approach is to keep hashes of all possible fragments from the library and only compare hashes of these fragments to the hashes of fragments of the file under investigation.

Computational complexity of such approach will be reduced to O (N fr*N doc*log (N libr)), because the computational complexity of searching for a hash in a sorted list of hashes of similar length is 0 (log (N libr)). A sliding window can be used to obtain all fragments of length N fr when the next fragment is generated by removal of the first symbol of the previous fragment and addition of a symbol immediately following the previous fragment.

FIG. 1 shows a sliding window algorithm of generation of N-fragments from a file. In FIG. 1, a hashing algorithm is shown that generates a hash of the following fragment by applying certain arithmetic operations to the hash of the previous fragment and the symbols that are removed and added unlike the regular hashing algorithm that uses all symbols in the fragment to calculate hash. The complexity of such an algorithm is O (N fr). If this hashing algorithm is used, the complexity of this algorithm decreases to O (N doc*log (N libr)).

Another way to decrease computational complexity of the described algorithm is to decrease the number of hashes (i.e., not to store all hashes of all possible N doc–N fr fragments within a document).

This proposes a way to decrease the number of hashes that still guarantees a successful identification of matches of fragments of length N fr*2.

That is, if a hash is calculated on 50 symbols, then if 100 symbols are matched in the document under investigation and one of the fragments from the library, then the hash of the 50 symbols is guaranteed to be the same.

The lowering of the number of hashes decreases the number of searches and comparisons thus decreasing calculational complexity of the algorithm.

Another way to lower the number of hashes is to only consider hashes of fragments that start with the first letter of the word or even the first letter of the sentence.

This would propose further different optimization strategies for different categories of files under investigation, textual (or containing text) and only binary.

Textual (or containing text) are data types from which text can be extracted. Binary formats are the formats that do not support straight-forward extraction of text.

This proposes using a larger sliding window for creation of hashes. A size of the sliding windows can be a parameter available to the user through program GUI for viewing and editing.

Another possible way of conversion of a binary file to a text file is decompilation (a process reverse to compilation) when a human-readable file is produced based on previously compiled binary file.

If a text is successfully extracted from a file, then it proposes an optional step of normalization before calculation of hashes. Possible normalization steps may include:

(1) using a previously compiled dictionary of "noise words", remove all such words;
(2) removing all formatting, double spaces or all spaces, and punctuation;
(3) replace all symbols with modifiers to Latin symbols without modifiers, e.g., "äéçïñ", to "aecin". That can be done by multiple methods, for example, pre-programmed replacement or with decomposition that breaks each complex symbol into two parts, e.g., "ü" is broken into "u"+""""+"¨", and the modifiers are removed. Such a process may be implemented with the use of the ICU library;
(4) removal of repeating symbols;
(5) removal of vowels for languages that have vowels; and
(6) conversion of non-Latin languages to Latin symbols, e.g., using transliteration for Cyrillic alphabets.

The library of hashes of known proprietary information fragments is formed by a certain process. That process for textual (or files with textual information) may include extraction of textual normalization.

That process for textual (or files with textual information) may include text normalization. Hashes may be classified, for example, as textual or binary files.

Before a new hash is added to the database only if the same has already does not exist within the database.

If a hash already exists, then a link to the file containing a fragment that was used to generate such hash may be added indicating that such hash was found in another file.

Also, if hash already exists, and a hierarchical classification (e.g., proprietary-secret-top secret), then the hash may be assigned the lowest of classifications of all files where such hash was found.

Hash description (vector) may include additional elements, for example, the field or part of the file where such hash was located.

Before hashes are calculated for a binary file, a binary normalization process may be applied, or textual information may be removed from the file.

For a given file, several sets of hashes may be added, e.g., that file may be processed as a binary file, as file containing textual information, and as a binary file with removed textual information.

A separate process may be used that generates hashes of files that exist in public domain that are in some way, shape or form related to the subject matter of the protected files with proprietary data. If a hash of a fragment for a file from a public domain is found, then such hash may be removed from the library of hashes as a false positive.

Certain statistics or other calculated values may be used to make a classification decision about the file under investigation, such as:

(1) number of files in the library to which matches have been found in the file under investigation;
(2) ratios of number of matched fragments in the library file to the total number of fragments in such file; and
(3) classification of files from the library with fragments matching fragments of the file under investigation.

More specifically, FIG. 1 demonstrates a sample process of generation of fragments of length N (for N=7) from a file 101 using the sliding window algorithm with fixed step=1. Similar sliding window algorithms may be realized with different steps, either fixed or variable depending on certain criteria (e.g., starting only on first letters of words).

For simplicity, FIG. 1 assumes that numeration of symbols starts with 1. Hence, the index of the last symbol in the file of K symbols will be K.

FIG. 1 assumes that 7-symbol fragments for earlier characters have been generated in a similar way, starting with the first symbol, and repeating the process for each sequential character, e.g., 1st, 2nd, 3rd, 4th, 5th, 6th, 7th, 8th, 9th, etc.

The process is shown for a part of a file of 10 symbols long that allows for generation of 4=(Length of file minus Length of Fragment plus 1)=10−7+1.

The values of symbols in this example are given as letters of Latin alphabet, but in general case they can be any numeric values from the allowed range, e.g., from 0 to 255. Symbols do not have to represent ASCII characters (e.g., this algorithm is applicable to binary files).

Ate step #i (102), the process points to the symbol #i (the sliding window of 7 symbols starting with the symbol in the i position). The 7-fragment corresponding to this character consists of sequential symbols located at the positions I, i+1, i+2, i+3, i+4, i+5, i+6: "abcdefg".

Once the 7-fragment #i has been generated, the sliding window moves one character forward to the character i+1. On the step #i+1 (102), the process points to the symbol #i+1 (the sliding window of 7 symbols starting with a symbol in the i+1 position). The 7-fragment corresponding to this character consists of sequential symbols located at the positions i+1, i+2, i+3, i+4, i+5, i+6, i+7: "bcdefgh".

Once the 7-fragment #i+1 has been generated, the sliding window moves one character forward to the character #i+2.

On the step #i+2 (103), the process points to the symbol #i+2 (the sliding window of 7 symbols starting with symbol in the i+2 position). The 7-fragment corresponding to this character consists of sequential symbols located at the positions i+2, i+3, i+4, i+5, i+6, i+7, i+8: "cdefghi".

Once the 7-fragment #i+2 has been generated, the sliding window moves one character forward to the character #i+3.

On the step #i+3 (104), the process points to the symbol #i+3 (the sliding window of 7 symbols starting with a symbol in the i+3 position). The 7-fragment corresponding to this character consists of sequential symbols located at the positions i+3, i+4, i+5, i+6, i+7, i+8, i+9: "defghij".

Once the 7-fragment #i+3 (105) has been generated, the sliding window moves one character forward to the character #i+4 or, if the symbol at the position i+9 is the last in the file, the process ends.

In general, after the N-fragment corresponding to the symbol at the position i has been generated, the system either moves to the next symbol i+1 if the symbol at the position i+N−1 is not the last symbol in the file and finishes otherwise (if the symbol at the position i+N−1 is the last symbol in the file).

FIG. 2 represents a sample process of adding information about a Known File with Protected Data K Symbols Long (the New File) (201) to the Library of Known Protected Fragments. For simplicity that numeration of symbols in the New File starts with 1.

At the beginning of the process, the sliding window algorithm points to the first symbol of the file. The first position of the file is selected for the exemplary purposes only. The process may start at another character selected using certain criteria (e.g., the first letter of the first word except for prepositions or the first letter of the first word excluding salutation or header).

After the starting position for the sliding window algorithm has been selected (i), the process checks if there are enough symbols left in the file starting with the position i to fill the N fragment (202). In other words, the sliding window algorithm performs until it reaches a position i such that the length of the continuous sequence of symbols starting with the position i and ending with the position K (the last position in the file) is shorter that N.

If the check (203) determines that there are enough symbols left in the New File to extract another N-fragment from the New File, then the process extracts the corresponding N-fragment #i (204).

If the check (203) determines that there are not enough symbols left in the New File to extract another N-fragment from the New File, then the process exits (207).

In general, the number i may not be the actual sequence number of the current N fragment, but only denotes the position of the symbol where that fragment starts as the sliding window process may use iterative steps larger than 1.

After the N-fragment #i is extracted (204), information about that fragment is added to the Library of Known Protected Files (205).

The process of addition of the new fragment may be as simple as adding it to the list but can also include additional actions and checks.

For example, a hash of that fragment can be calculated and added to the database along with or instead of the fragment.

A check may be performed if such a fragment (or its hash or other representation) already exists in the database, and different actions can be performed if it exists or not. For example, if the fragment already exists in the database, no action is taken. As another example, if the fragment does not exist in the database, the fragment, its hash or any other representation of the fragment (or their combination) are added to the database.

The database may also include, for example, statistics for each fragment such as classifications of files where these fragments have been located, counts of how many times the fragment has been located in files or in files of each category.

After the information about the N-fragment #i has been added to the Library of Known Protected Fragments, the sliding window moves to the next character (206). In this example, the count i is increased by 1, but in reality, the step may be different, for example, the first symbol of the sliding window may move to the next first letter of the next word.

Figure 3:
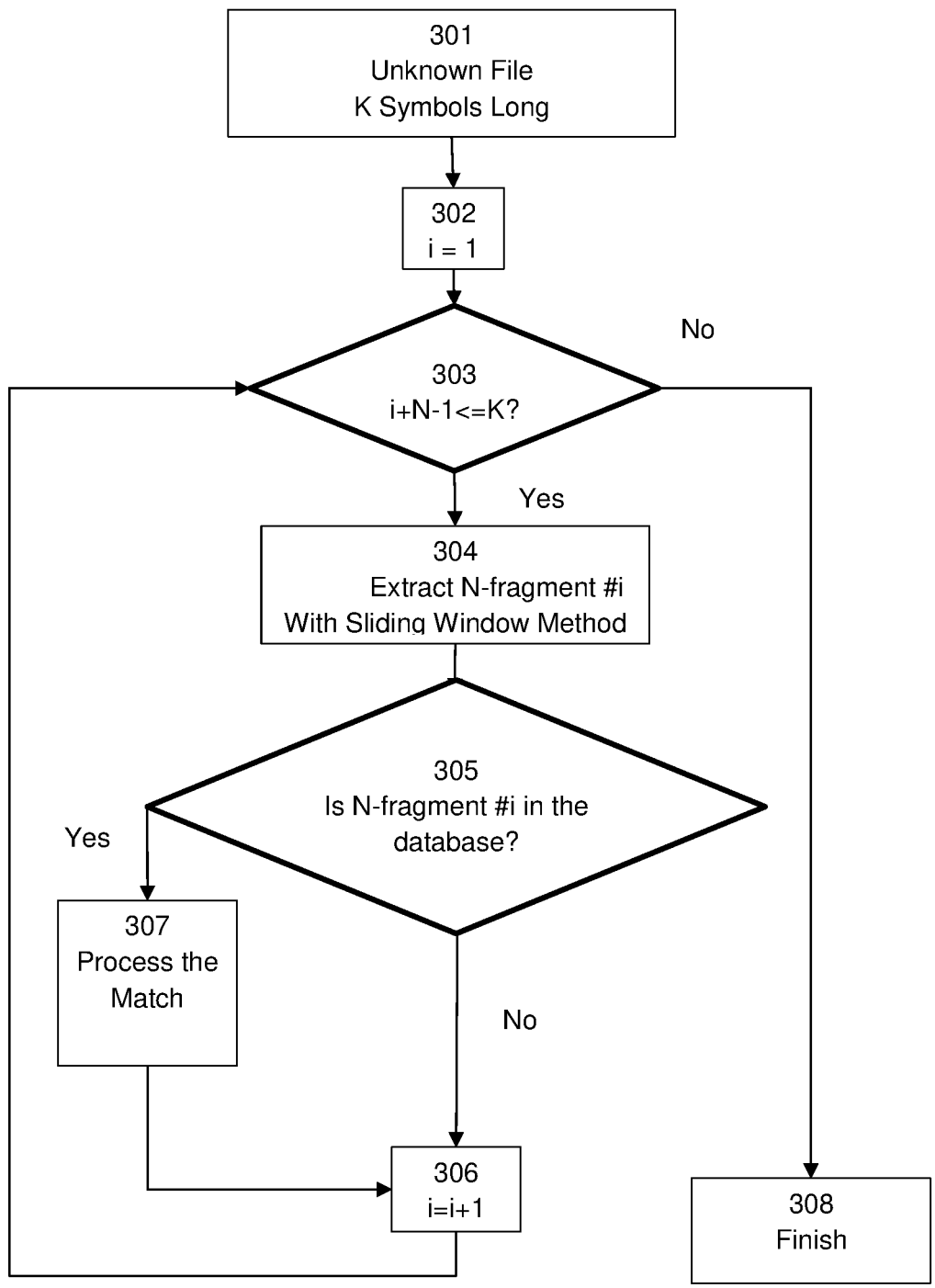
FIG. 3 represents a sample process of checking an Unknown File against the Library of Known Protected Fragments according to an exemplary embodiment.

FIG. 3 represents a sample process of checking an Unknown File (301) against the Library of Known Protected Fragments. FIG. 3 assumes for simplicity that numeration of symbols in the Unknown File starts with 1.

At the beginning of the process, the sliding window algorithm points to the first symbol of the file. The first position of the file is selected for the exemplary purposes only. The process may start at another character selected using certain criteria (e.g., the first letter of the first word except for prepositions or the first letter of the first word excluding salutation or header).

After the starting position for the sliding window algorithm has been selected (i), the process checks if there are enough symbols left in the file starting with the position i to fill the N fragment (302).

In other words, the sliding window algorithm performs until it reaches a position i such that the length of the continuous sequence of symbols starting with the position i and ending with the position K (the last position in the file) is shorter that N.

If the check (303) determines that there are enough symbols left in the Unknown File to extract another N-fragment from the Unknown File, the process extracts the corresponding N-fragment #i (304).

If the check (303) determines that there are not enough symbols left in the Unknown File to extract another N-fragment from the Unknown File, the process exits (308).

In general, the number i may not be the actual sequence number of the current N fragment, but only denotes the position of the symbol where that fragment starts as the sliding window process may use iterative steps larger than 1.

After the N-fragment #i is extracted (304), a check is performed to find out whether information about that fragment already exists in the Library of Known or Known Protected Fragments (305). That check may be a comparison of the fragments itself, their hashes or any other parameters identifying fragments exactly or with a sufficient degree of certainty.

If information about the current N-fragment has been located in the Library of Known Protected Fragments (305), the process performs one or more steps to process the match. These steps may be as simple as marking the Unknown File as containing protected information and existing (308) or be more complex, when a more granular information is needed, e.g., how many fragments from the file matched, what were the classifications of the matching fragments in the Library, etc. After the match has been processed (307), the sliding window moves to the next character (306). In this example, the count i is increased by 1, but in reality, the step may be different, for example, the first symbol of the sliding window may move to the next first letter of the next word.

If information about the current N-fragment has been located in the Library of Known Protected Fragments (305), then the sliding window moves to the next character (206). In this example, the count i is increased by 1, but in reality, the step may be different, e.g., the first symbol of the sliding window may move to the next first letter of the next word.

It is noted that some portions of the detailed description are presented in terms of algorithms and symbolic representations of operations within a computer. An algorithm is a series of defined steps leading to a desired end state or result. In example implementations, the steps carried out require physical manipulations of tangible quantities for achieving a tangible result.

Example implementations include an apparatus and system for performing the operations described above. This apparatus is typically a computer specially constructed for the required purposes with suitable programming. Such computer programs are stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

In addition, the example implementations are not described with reference to any particular programming language. It will be appreciated that a variety of programming languages may be used to implement the teachings of the example implementations as described herein. The instructions of the programming language may be executed by one or more processing devices, such as central processing units, processors, or controllers.

The operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Moreover, the various functions described can be performed in a single unit or can be spread across a number of components in any number of ways.

Moreover, other implementations of the present application will be apparent to those skilled in the art from consideration of the specification and practice of the teachings of the present application. Various aspects or components of the described example implementations may be used singly or in any combination. It is intended that the specification and example implementations be considered as examples only, with the true scope and spirit of the present application being indicated by the following claims.

The invention claimed is:

1. A method for creating a notice that identifies protected data in an unknown file of length L within a computer network, the method comprising:
populating a library of known fragments of protected data using a library sliding window to generate the known fragments from a plurality of known files, including:
extracting a known file N-fragment i from a known file of the plurality of known files,
adding the known file N-fragment i and a hierarchical class of the known file and a number of different files of other hierarchical classes that includes the known file N-fragment i to the library of known fragments,
incrementing i based on the library sliding window and repeating the extracting and adding until another N-fragment sequence of symbols in the known file cannot be extracted, and
repeating the extracting, adding, and incrementing for the plurality of known files;
generating an N-fragment N(I) of continuous symbols of length N starting with symbol I from the unknown file for each integer I starting with K: K>0, K<L−N+1, with integer step S(I): S(I)>0, I+S(K)<L−N+1;
checking, for each generated fragment, whether information about the generated fragment exists in the library of known fragments of protected data, wherein the checking stops after a first match is found in the library of known fragments that identifies the presence of protected data; and
creating a notice indicating that the unknown file contains protected data and the hierarchical class if the information about the generated fragment from the unknown file exists in the library of known fragments of protected data; and
communicating the notice to at least one networked computer.

2. The method of claim 1, further comprising the step of performing preprocessing steps before the step of generating an N-fragment N(I).

3. The method of claim 1, wherein the step of generating an N-fragment N(I) starts at a first symbol.

4. The method of claim 1, wherein the step of generating an N-fragment N(I) starts at a location calculated according to a predetermined formula.

5. The method of claim 1, wherein the step of generating an N-fragment N(I) comprises a sliding window process starting at a location calculated according to predetermined criteria.

6. The method of claim 1, wherein the step of generating an N-fragment N(I) comprises a sliding window process applies an iterative step of 1 symbol.

7. The method of claim 1, wherein the step of generating an N-fragment N(I) comprises a sliding window process applies an iterative step calculated according to a predetermined formula or criteria.

8. The method of claim 1, further comprising the step of preprocessing unknown files according to a file type.

9. The method of claim 1, further comprising the step of preprocessing predetermined binary unknown files.

10. The method of claim 1, further comprising:
preprocessing the unknown file depending on a detected type of the unknown file including by a first formatting for a first type of content of the unknown file and a second formatting for a second type of content of the unknown file.

11. The method of claim 1, further comprising:
generating a hash of N-fragment N(I) by applying an arithmetic operation to a hash of N-fragment N(I−1) and symbols removed between N-fragment N(I−1) and N-fragment N(I).

12. A system for identifying the presence of protected data in an unknown file, the system comprising:
a processor coupled to a memory storing instructions, the processor being configured to implement the instructions to:
populate a library of known fragments of protected data using a library sliding window to generate the known fragments from a plurality of known files, including:
extracting a known file N-fragment i from a known file of the plurality of known files,
adding the known file N-fragment i and a hierarchical class of the known file and a number of different files of other hierarchical classes that includes the known file N-fragment i to the library of known fragments, incrementing i based on the library sliding window and repeating the extracting and adding until another N-fragment sequence of symbols in the known file cannot be extracted, and repeating the extracting, adding, and incrementing for the plurality of known files;

apply a sliding window process to generate one or more fragments of length;

check, for each generated fragment, whether information about the generated fragment exists in the library of known fragments of protected data, wherein the check of whether information about the generated fragment exists in the library of known fragments stops after a first match is found; and if the information about the generated fragment from the unknown file exists in the library of known fragments of protected data, either change or create a record indicating that the unknown file contains protected data and the hierarchical class or send a communication indication that the unknown file contains protected data and the hierarchical class.

13. The system according to claim 12, wherein the processor is further configured to perform preprocessing steps before the sliding window process is applied.

14. The system according to claim 12, wherein the sliding window process starts at a first symbol.

15. The system according to claim 12, wherein the sliding window process starts at a location calculated according to a predetermined formula.

16. The system according to claim 12, wherein the sliding window process starts at a location calculated according to predetermined criteria.

17. The system according to claim 12, wherein the sliding window process applies an iterative step of 1 symbol.

18. The system according to claim 12, wherein the sliding window process applies an iterative step calculated according to a certain formula or criteria.

19. The system according to claim 12, wherein the processor is further configured to preprocess unknown files according to file type.

20. The system according to claim 12, wherein the processor is further configured to preprocess predetermined binary unknown files.

* * * * *